(12) United States Patent
Le Besnerais et al.

(10) Patent No.: US 9,356,491 B2
(45) Date of Patent: May 31, 2016

(54) MAGNETIC CAP ELEMENT FOR A STATOR OF A GENERATOR

(75) Inventors: Jean Le Besnerais, Mons en Baroeul (FR); Henrik Stiesdal, Odense C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 302 days.

(21) Appl. No.: 13/278,357

(22) Filed: Oct. 21, 2011

(65) Prior Publication Data
US 2012/0112569 A1    May 10, 2012

(30) Foreign Application Priority Data

Nov. 4, 2010   (EP) .................................... 10189985

(51) Int. Cl.
*H02K 9/19* (2006.01)
*H02K 15/02* (2006.01)
*H02K 1/20* (2006.01)
*H02K 5/20* (2006.01)
*H02K 7/18* (2006.01)

(52) U.S. Cl.
CPC .. *H02K 9/19* (2013.01); *H02K 1/20* (2013.01); *H02K 5/20* (2013.01); *H02K 7/1838* (2013.01); *Y02E 10/725* (2013.01); *Y10T 29/49009* (2015.01)

(58) Field of Classification Search
CPC ............. H02K 1/20; H02K 5/20; H02K 9/19; H02K 7/1838; Y10T 29/49009; Y02E 10/725
USPC .......................... 310/54, 58, 59, 60 A; 29/596
See application file for complete search history.

(56) References Cited

U.S. PATENT DOCUMENTS

| | | | | |
|---|---|---|---|---|
| 2,338,154 A | * | 1/1944 | Wilkinson | 310/54 |
| 2,818,515 A | * | 12/1957 | Dolenc | 310/57 |
| 3,414,749 A | * | 12/1968 | Abegg | 310/52 |
| 3,487,243 A | * | 12/1969 | Rolf-Dieter et al. | 310/54 |
| 3,663,848 A | * | 5/1972 | Lehoczky | 310/90 |
| 3,735,174 A | | 5/1973 | Bösch et al. | |
| 3,904,901 A | * | 9/1975 | Renard et al. | 310/52 |
| 4,278,905 A | * | 7/1981 | Chari et al. | 310/52 |
| 4,839,545 A | * | 6/1989 | Chitayat | 310/12.23 |
| 5,717,267 A | * | 2/1998 | Paroz | 310/54 |
| 5,920,145 A | * | 7/1999 | Wu et al. | 310/328 |
| 6,657,332 B2 | * | 12/2003 | Balas | 310/58 |
| 6,809,442 B2 | * | 10/2004 | Kaneko et al. | 310/58 |
| 7,061,148 B2 | * | 6/2006 | Philippart | 310/58 |
| 7,629,715 B1 | * | 12/2009 | Sortore et al. | 310/54 |
| 7,633,194 B2 | * | 12/2009 | Dawsey et al. | 310/57 |
| 2002/0149273 A1 | * | 10/2002 | Soitu et al. | 310/58 |
| 2003/0062780 A1 | * | 4/2003 | Kaneko et al. | 310/58 |
| 2004/0012272 A1 | * | 1/2004 | Houle et al. | 310/54 |
| 2005/0189834 A1 | * | 9/2005 | Ikeda et al. | 310/179 |

(Continued)

FOREIGN PATENT DOCUMENTS

| | | | | |
|---|---|---|---|---|
| EP | 0932246 A2 | 7/1999 | | |
| JP | 54131704 A | * | 10/1979 | ............... H02K 9/08 |

(Continued)

*Primary Examiner* — Alex W Mok

(57) ABSTRACT

A stator system for a generator, in particular a generator of a wind turbine is disclosed. The stator system includes a housing element including a groove and a cap element for closing the groove such that a channel for guiding a cooling fluid within the groove is formed. The cap element includes a magnetic material.

13 Claims, 1 Drawing Sheet

(56) References Cited

U.S. PATENT DOCUMENTS

| | | |
|---|---|---|
| 2005/0269889 A1 | 12/2005 | Tessier et al. |
| 2007/0273220 A1* | 11/2007 | Koyama et al. ............... 310/58 |
| 2008/0100159 A1* | 5/2008 | Dawsey et al. ............... 310/54 |
| 2009/0026771 A1* | 1/2009 | Bevington et al. ............ 290/55 |
| 2009/0026858 A1* | 1/2009 | Knauff ......................... 310/59 |
| 2009/0121564 A1* | 5/2009 | Pal et al. ...................... 310/58 |
| 2009/0195108 A1* | 8/2009 | Rippel ......................... 310/214 |
| 2009/0261668 A1* | 10/2009 | Mantere ....................... 310/54 |
| 2010/0026111 A1* | 2/2010 | Monzel ......................... 310/59 |
| 2010/0207465 A1* | 8/2010 | Dutau et al. ................... 310/64 |
| 2011/0109095 A1* | 5/2011 | Stiesdal ........................ 290/55 |
| 2011/0133580 A1* | 6/2011 | Sugimoto et al. ............. 310/54 |

FOREIGN PATENT DOCUMENTS

| | | |
|---|---|---|
| JP | 8266013 A | 10/1996 |
| WO | WO 2005112228 A1 | 11/2005 |

* cited by examiner

MAGNETIC CAP ELEMENT FOR A STATOR OF A GENERATOR

CROSS REFERENCE TO RELATED APPLICATIONS

This application claims priority of European Patent Office application No. 10189985.4 EP filed Nov. 4, 2010, which is incorporated by reference herein in its entirety.

FIELD OF INVENTION

The present invention relates to a stator system for a generator, in particular a generator of a wind turbine. Moreover, the present invention relates to a method for manufacturing a stator system for a generator, in particular a generator of a wind turbine.

ART BACKGROUND

In generators for wind turbines, heat is generated when transforming mechanical energy in electrical energy. The heat is generated in the copper conductors that form the windings of the stator e.g. by Joule losses. The generated heat has to be removed in order to avoid hotspots and insulation wearing.

The stator housing and the attached windings are generally cooled by blowing air inside the stator. In axial end sections of the stator housings the windings protrude and form a half loop. The protruding half loops of the windings form the end windings of the stator windings. The stator windings are cooled by blowing air through the windings, for example in an air gap between rotor and stator or through radial extending ducts of the stator housing.

It is also known to attach cooling pipes or hollow copper strains to the stator housing in order to provide a liquid cooling. The conductor sections of the windings that are attached to the stator housing are thereby cooled, but the protruding end windings are only cooled with a lesser efficiency, so that hotspots at the end windings may occur and may lead to damages of the stator winding.

The cooling pipes are attached into grooves along the stator housing. The electromagnetic flux may be interrupted or negatively affected by the grooves and the attached cooling pipes.

SUMMARY OF THE INVENTION

It is an object of the present invention to provide a proper cooling for a stator system.

This object is solved by a stator system for a generator, in particular a generator of a wind turbine, and by a method of manufacturing a stator system for a generator, in particular a generator of a wind turbine, according to the independent claims.

According to a first aspect of the present invention, a stator system for a generator, in particular a generator of a wind turbine, is presented. The stator system comprises a housing element with a groove and a cap element. The cap element is adapted for closing the groove such that a channel for guiding a cooling fluid within the groove is formed. The cap element comprises a magnetic material.

According to a further exemplary embodiment, a method of manufacturing a stator system for a generator, in particular a generator of a wind turbine, is presented. According to the method, a groove is formed in a housing element of the stator system. A cap element is mounted to the housing element for closing the groove such that a channel for guiding a cooling fluid within the groove is formed. A cap element comprises a magnetic material.

The housing element forms an individual section or a complete housing of a stator of a generator. If the housing element is only a section of the stator housing, a plurality of housing elements may be attached to one another in order to form the stator housing, i.e. the stator stack. The housing elements of the stator extend around a shaft of a rotor of the generator. Hence, the housing elements may comprise a circular or curved extension in circumferential direction with respect to the shaft. Moreover, the housing elements comprise a longitudinal direction, wherein the longitudinal direction is substantially parallel to the axial direction of the shaft. The housing element may comprise a plurality of sheets that are fixed together along the axial direction such that a stator lamination is formed. The stator lamination forms the housing element. The housing element comprises an inner surface and an outer surface, wherein the inner surface is located closer to the shaft in radial direction than the outer surface.

The windings of the stator are in general attached to the inner or outer surface of a housing element. For example, the windings may be attached to slots that are formed in the inner or outer surface and that run generally along the axial direction of the shaft.

The groove may be formed along the inner or outer surface of the housing element. The groove may be formed along a circumferential direction around the shaft or in longitudinal direction of the housing element, i.e. along the axial direction with respect to the shaft.

The cap element is mountable to the housing element for closing the groove. The material of the cap element may comprise paramagnetic characteristics or ferromagnetic characteristics. The cap element may be mounted to the groove in such a way, that the groove is fluid-tight such that a leakage of the cooling fluid is prevented. Hence, no further cooling pipes may be necessary. Additionally or alternatively, the groove is formed in such a way that a cooling pipe is insertable into the groove.

By the cap element that comprises a magnetic material, the electromagnetic flux along the stator inner or outer surface is not or less affected by the groove for the cooling fluid.

The electromagnetic flux may flow from the housing element along the magnetic cap element and is not interrupted by the groove formed into the housing element. Hence, proper electromagnetic flux is achieved which results in an improved efficiency of the generator.

According to a further exemplary embodiment, the stator system further comprises an insulation layer that is located between the cap element and an inner volume of the groove. The insulation layer may comprise for example a rubber sealing or a felt layer. The insulation layer has the technical effect that an improved thermal contact between the cap element and the cooling fluid may be achieved. In particular, the thermal loss of the cooling fluid through an opening of the groove may be reduced. Moreover, the groove may be insulated such that cooling fluid leakage may be prevented.

According to a further exemplary embodiment, the stator system further comprises a resin layer. The resin layer covers the housing element and the cap element. By applying a resin layer for covering the housing element in the cap element, a homogeneous surface without protrusions may be formed.

According to a further exemplary embodiment, the housing element comprises a first three-dimensional contour and the cap element comprises a second three-dimensional contour. The second three-dimensional contour is complementary to the first three-dimensional contour in such a way, that the cap element is slidably connectable to the first three-dimensional contour for fixing the cap element to the housing element.

In particular, according to a further exemplary embodiment, the first three-dimensional contour of the housing element comprises a guiding notch, wherein the second three-dimensional contour of the cap element comprises an edge section, wherein the guiding notch is formed in such a way that the edge section (e.g. with a protrusion) of the cap element is slidably insertable into the guiding notch for fixing the cap element to the housing element.

In order to provide a more robust connection, the edge section of the cap element comprises a wedge profile (e.g. a V-shaped protrusion) and the guiding notch comprises a (complementary) V-shaped profile (recess), wherein the V-shaped profile corresponds to the wedge profile of the edge section of the cap element, according to an exemplary embodiment.

In another exemplary embodiment, the V-shaped profile (recess) may be formed in the cap element and the edge section, which may be a protrusion or a guiding rail, may be formed in a sidewall of the groove.

Hence, by the above-described connections, which enable a slidable insertion of the cap element to the housing element, a proper manufacture method of the stator system is achieved. The cap element may be simply slid to the groove section of the housing element, so that an easy and fast installation of the cap element is achieved. Moreover, by milling the first three-dimensional contour to the groove of the housing element, a back-fitting of existing stator housing elements may be achieved such that a back-fitting with cap elements is possible.

According to a further exemplary embodiment, the groove is rectangular. The groove comprises an open side and three or more plane surfaces inside the housing element, which are in contact with the cooling fluid, so that an improved heat transfer between the cooling element and the heat in the housing elements may be achieved.

In a further exemplary embodiment, the groove comprises a profile (contour) that is adapted to a profile of the insertable cooling pipe. In particular, the cooling pipe may have a rectangular shape or a circular shape (i.e. cross-section). Hence, if the profile of the groove is adapted to the profile of the cooling pipe, the contact areas between the cooling pipe and the housing element are increased, so that an improved heat transfer between the cooling fluid and the housing element may be achieved.

According to a further exemplary embodiment of the method, an insulation layer (e.g. comprising a felt material) is interposed between the cap element and the inner volume of the groove.

According to a further exemplary embodiment, the housing element and the cap element are impregnated by a resin impregnation process. By applying the resin impregnation process, the stator system, comprising for example the cap element, the housing element and/or the insulation layer, are dunked in a resin bath, so that e.g. after curing a homogeneous component may be manufactured. In particular, the insulation layer may be formed of a felt. When applying the resin impregnation process, the felt soaks some resin and swells. Hence, the felt may act as a spring that presses the cap element to the housing element. Additionally or alternatively, the felt element that is soaked with resin acts as a spring and presses the cap element away from the cooling pipe inside the groove, so that the cap element is pressed with its second three-dimensional contour to the first three-dimensional contour. Hence, the felt, which acts as a spring, reinforces the connection between the cap element and the housing element and additionally presses the pipe tight into the groove, so that as well the fixation of the cooling pipe is achieved.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
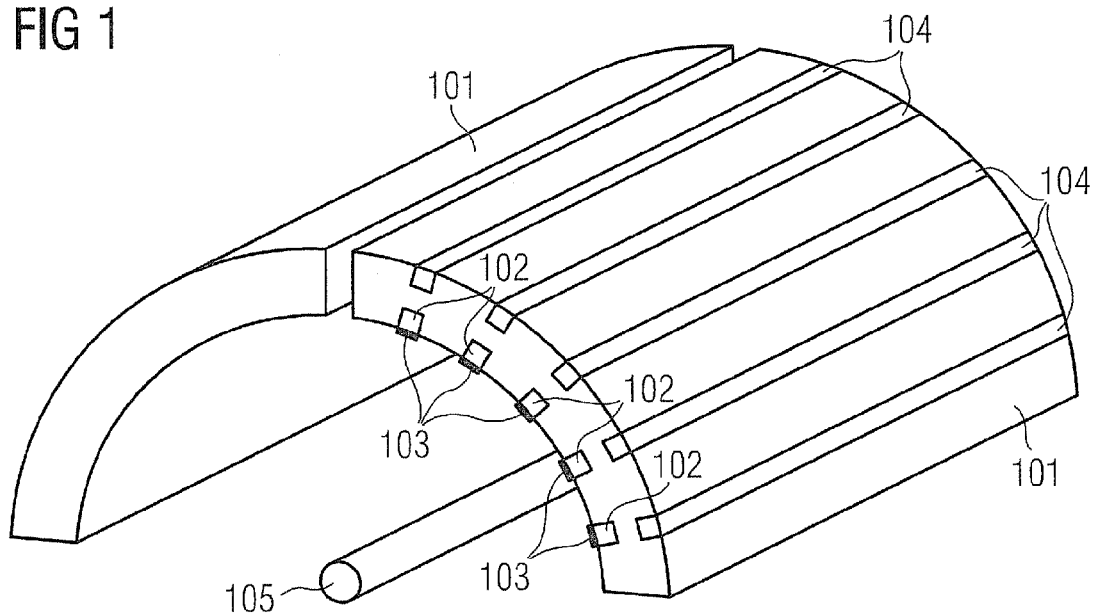
FIG. 1 illustrates a three-dimensional view of a housing element comprising a magnetic cap element according to an exemplary embodiment of the present invention.

The illustrations in the drawings are schematical. It is noted that in different figures, similar or identical elements are provided with the same reference signs.

In FIG. 1, the right housing element 101 is shown in more detail including the grooves 102 and the slots 104. The left housing element 101 is illustrated in a simplified manner, although the left housing element 101 may comprise the features of the right housing element 101 as well. Into the slots 104 the windings of the stator system 100 may be inserted and attached. In order to cool the slots 104 and the inserted stator windings, the grooves 102 are formed close to the slots 104.

As shown in FIG. 1, the housing elements 101 comprise an inner surface and an outer surface with respect to a radial direction to a shaft 105 of the generator. In the exemplary embodiment of FIG. 1, the grooves 102 are formed to the inner surface and the slots 104 are formed to the outer surface of the housing element 101. Both, the slots 104 and the grooves 102 run along a longitudinal direction of the housing element 101, wherein the longitudinal direction is substantially parallel to an axial direction of the shaft 105.

As shown in FIG. 1, the housing elements 101 comprise an inner surface and an outer surface with respect to a radial direction to a shaft 105 of the generator. In the exemplary embodiment of FIG. 1, the grooves 103 are formed to the inner surface and the slots 104 are formed to the outer surface of the housing element 101. Both, the slots 104 and the grooves 103 run along a longitudinal direction of the housing element 101, wherein the longitudinal direction is substantially parallel to an axial direction of the shaft 105.

As shown in FIG. 1, the grooves 102 are closed by the cap elements 103 that are attached to the inner surface of the housing element 101.

Figure 2:
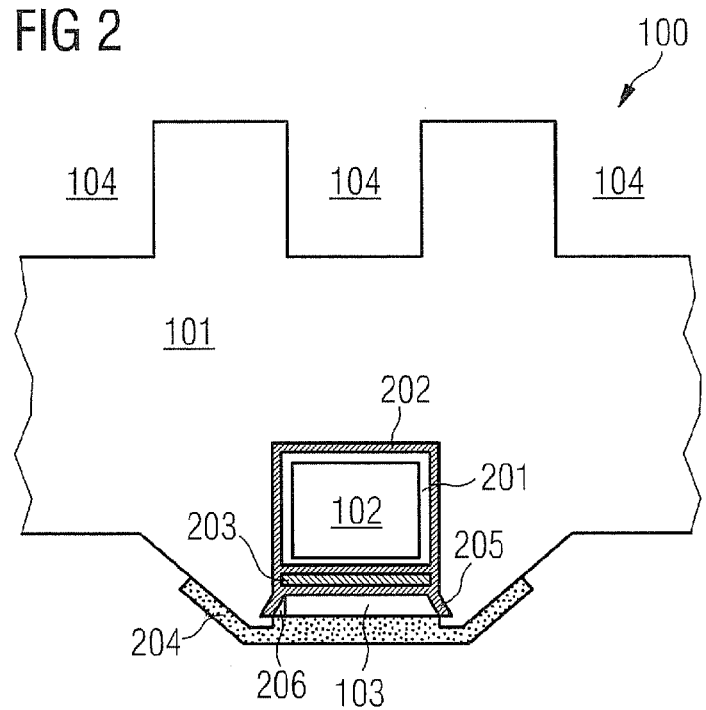
FIG. 2 shows a detailed view of the housing element comprising the cap element according to an exemplary embodiment of the present invention.

FIG. 2 illustrates a more detailed view of the stator system 100. To the housing element 101 the groove 102 is formed. Inside the groove 102 the cooling fluid may flow. In particular, a cooling pipe 201 may be attached to the groove 102, through which the cooling fluid flows. The groove 102 may comprise a profile that is adapted (i.e. that corresponds) to the profile (cross-section) of the cooling pipe 201 in order to form a larger contact area between the housing element 101 and the cooling pipe, which enables a better thermal convection, i.e. heat exchange.

In order to improve the thermal connection between the cooling pipe 201 and the housing element 101, resin 202 may be injected around the cooling pipe 201.

Additionally, between the cap element 103 and the cooling pipe 201 or between the cap element 103 and the inner volume of the groove 102, an insulation layer 203, such as a felt e.g. made of natural or plastic fibres, may be interposed. Hence, by the insulation layer 203 a water-tight groove 102 may be generated. Moreover, if the insulation layer 203 comprises a felt, the felt may be soaked with resin which may be injected by a resin impregnation process, so that the felt of the insulation layer 203 increases its size and presses the cooling pipe 201 into the housing element 101 and a better fixation of the cooling pipe into the groove 102 and a better heat transfer may be achieved.

Additionally, if the felt of the insulation layer 203 increases its size by soaking resin, the cap element 103 is pressed to a first three-dimensional contour, so that a fixation of the cap element 103 to the housing element 101 may be improved as well.

The first three-dimensional contour 205 of the housing element 101 may form for example a guiding notch, such as a V-shaped notch. The cap element 103 may comprise a second three-dimensional contour 206 that may form in particular in the edge sections of the cap element 103 a wedge profile, which fits into the guiding notch of the housing element 101. Hence, a slidable connection between the cap element 103 and the housing element 101 may be generated, so that the cap element 103 may easily be mounted to the housing element 101. In order to fix the cap element 103 against a further sliding with respect to the housing element 101, the resin soaked felt of the insulation layer 203 that acts e.g. as a spring may be interposed between the cap element 103 and the housing element and/or the cooling pipe 201.

As a finishing layer, a resin layer 204 may cover the housing element 101 and the cap element 103 in order to achieve a homogeneous surface.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A stator system of a wind turbine generator, the stator system comprising:
    a stator housing element, the stator housing element comprising a first surface comprising slots to which stator windings are attachable, and a second surface radially opposite to the first surface, the second surface comprising an axially extending groove,
    a cap element mounted to the stator housing element to close the groove such that a channel for guiding a cooling fluid within the groove is formed, and
    an insulation layer located between the cap element and an inner volume of the groove, wherein the insulation layer is impregnated with resin, and wherein the insulation layer comprises an expandable fibrous material arranged such that upon impregnation with the resin the insulation layer expands and acts as a spring to fix the cap element to the stator housing element,
    wherein the cap element comprises a magnetic material.

2. The stator system according to claim 1, further comprising
    a resin layer that covers the stator housing element and the cap element.

3. The stator system according to claim 1, further comprising
    wherein the stator housing element comprises a first three dimensional contour,
    wherein the cap element comprises a second three dimensional contour, and
    wherein the second three dimensional contour is complementary to the first three dimensional contour in such a way that the cap element is slidably connectable to the first three dimensional contour for fixing the cap element to the stator housing element.

4. The stator system according to claim 3,
    wherein the first three dimensional contour of the stator housing element comprises a guiding notch, and
    wherein the second three dimensional contour of the cap element comprises an edge section, and
    wherein the guiding notch is formed in such a way that the edge section of the cap element is slidably insertable into the guiding notch for fixing the cap element to the stator housing element.

5. The stator system according to claim 4,
    wherein the edge section of the cap element comprises a wedge profile,
    wherein the guiding notch comprises a V-shaped profile, and
    wherein the V-shaped profile corresponds to the wedge profile of the edge section of the cap element.

6. The stator system according to claim 1,
    wherein the groove is rectangular.

7. The stator system according to claim 1,
    wherein the groove comprises a profile configured to a profile of a cooling pipe that is insertable into the groove.

8. The stator system according to claim 1, wherein stator housing element is formed by a plurality of stator laminations.

9. The stator system according to claim 1, wherein the cap element is configured such that electromagnetic flux flows from the housing element along the magnetic cap element and is not interrupted by the groove formed into the stator housing element.

10. A method for manufacturing a stator system for a wind turbine generator, the method comprising
    forming an axially extending groove in a second surface of a stator housing element of the stator system, wherein the stator housing element comprises a first surface comprising slots to which stator windings are attachable, the first surface being radially opposite to the second surface,
    mounting a cap element to the stator housing element for closing the groove such that a channel for guiding a cooling fluid within the groove is formed,
    interposing an insulation layer between the cap element and an inner volume of the groove, and
    impregnating the insulation layer with resin, wherein the insulation layer comprises an expandable fibrous material such that upon impregnation of the insulation layer with the resin the insulation layer expands and acts as a spring to fix the cap element to the stator housing element, wherein the cap element comprises a magnetic material.

11. The method according to claim 10, impregnating the stator housing element and the cap element via a resin impregnation process.

12. The method according to claim 10, wherein the stator housing element is formed by a plurality of stator laminations.

13. The method according to claim 10, wherein the cap element is arranged such that electromagnetic flux flows from the housing element along the magnetic cap element and is not interrupted by the groove formed into the stator housing element.

\* \* \* \* \*